US011240537B2

United States Patent
Miller et al.

(10) Patent No.: US 11,240,537 B2
(45) Date of Patent: Feb. 1, 2022

(54) SET-TOP BOX WITH ENHANCED FEATURES AND SYSTEM AND METHOD FOR USE OF SAME

(71) Applicant: Enseo, Inc., Plano, TX (US)

(72) Inventors: Thomas R. Miller, Plano, TX (US);
Vanessa Ogle, Fairview, TX (US);
Charles T. Hixon, Garland, TX (US);
Craig D. Smith, Allen, TX (US)

(73) Assignee: Enseo, LLC, Plano, TX (US)

( * ) Notice: Subject to any disclaimer, the term of this patent is extended or adjusted under 35 U.S.C. 154(b) by 0 days.

(21) Appl. No.: 17/141,519

(22) Filed: Jan. 5, 2021

(65) Prior Publication Data

US 2021/0127143 A1    Apr. 29, 2021

Related U.S. Application Data

(63) Continuation of application No. 16/524,893, filed on Jul. 29, 2019, now Pat. No. 10,887,627, which is a continuation-in-part of application No. 16/365,444, filed on Mar. 26, 2019, now Pat. No. 10,602,198, which is a continuation of application No.
(Continued)

(51) Int. Cl.
*H04N 21/214* (2011.01)
*H04N 21/25* (2011.01)
*H04N 21/478* (2011.01)
*H04W 4/80* (2018.01)
*H04N 21/436* (2011.01)
(Continued)

(52) U.S. Cl.
CPC ......... *H04N 21/2143* (2013.01); *H04N 21/25* (2013.01); *H04N 21/4131* (2013.01); *H04N 21/43615* (2013.01); *H04N 21/478* (2013.01); *H04N 21/8126* (2013.01); *H04N 21/8146* (2013.01); *H04W 4/80* (2018.02)

(58) Field of Classification Search
CPC .............. H04N 21/2143; H04N 21/25; H04N 21/4131; H04N 21/43615; H04N 21/478; H04N 21/8126; H04N 21/8146
See application file for complete search history.

(56) References Cited

U.S. PATENT DOCUMENTS

| 5,661,517 A | 8/1997 | Budow et al. |
| 9,088,828 B2 | 7/2015 | Ogle et al. |
| (Continued) | | |

*Primary Examiner* — Sumaiya A Chowdhury
(74) *Attorney, Agent, or Firm* — Scott Griggs; Griggs Bergen LLP

(57) ABSTRACT

A set-top box with enhanced features and system and method for use of the same are disclosed. In one embodiment of the set-top box, the set-top box is deployed to provide an interactive portal in a hospitality establishment having multiple rooms, such as a hotel. The set-top box generates a default interactive portal as well as a guest-specific interactive portal, which is generated from a guest configuration profile having information including guest identification, a guest channel preference presentation, and a guest service preference presentation with guest account information. The guest configuration profile may also enable the creation of a local area wireless network with substantially the same behavior as the guest's home wireless network. The guest configuration profile may further enable the control of in-room amenities, such as temperature control, lighting, shades, and availability, for example.

20 Claims, 7 Drawing Sheets

Related U.S. Application Data

15/860,509, filed on Jan. 2, 2018, now Pat. No. 10,244,269, which is a continuation of application No. 15/847,247, filed on Dec. 19, 2017, now Pat. No. 10,142,663, which is a continuation of application No. 15/625,416, filed on Jun. 16, 2017, now Pat. No. 9,848,211, which is a continuation of application No. 15/203,515, filed on Jul. 6, 2016, now Pat. No. 9,716,902, which is a continuation-in-part of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/711,129, filed on Jul. 27, 2018, provisional application No. 62/188,976, filed on Jul. 6, 2015, provisional application No. 61/829,932, filed on May 31, 2013.

(51) Int. Cl.
*H04N 21/81* (2011.01)
*H04N 21/41* (2011.01)

(56) References Cited

U.S. PATENT DOCUMENTS

| | | |
|---|---|---|
| 9,326,009 B2 | 4/2016 | Ogle et al. |
| 9,848,211 B2 | 12/2017 | Ogle et al. |
| 10,142,663 B2 | 11/2018 | Ogle et al. |
| 10,244,269 B2 | 3/2019 | Ogle et al. |
| 2003/0061077 A1* | 3/2003 | Sagar ............ H04L 67/30 705/5 |
| 2004/0019513 A1 | 1/2004 | Colalancia |
| 2007/0050197 A1 | 3/2007 | Efron |
| 2008/0319807 A1 | 12/2008 | Weiss |
| 2010/0211489 A1 | 8/2010 | Zhang |
| 2010/0250707 A1 | 9/2010 | Dalley |
| 2010/0250717 A1 | 9/2010 | Akagi |
| 2015/0276238 A1 | 10/2015 | Matsuoka et al. |
| 2016/0286265 A1* | 9/2016 | Watson ............ H04N 21/43637 |
| 2016/0330488 A1 | 11/2016 | Ogle et al. |
| 2017/0046650 A1 | 2/2017 | Mulji |
| 2017/0289580 A1 | 10/2017 | Ogle et al. |
| 2019/0222867 A1 | 7/2019 | Ogle et al. |

* cited by examiner

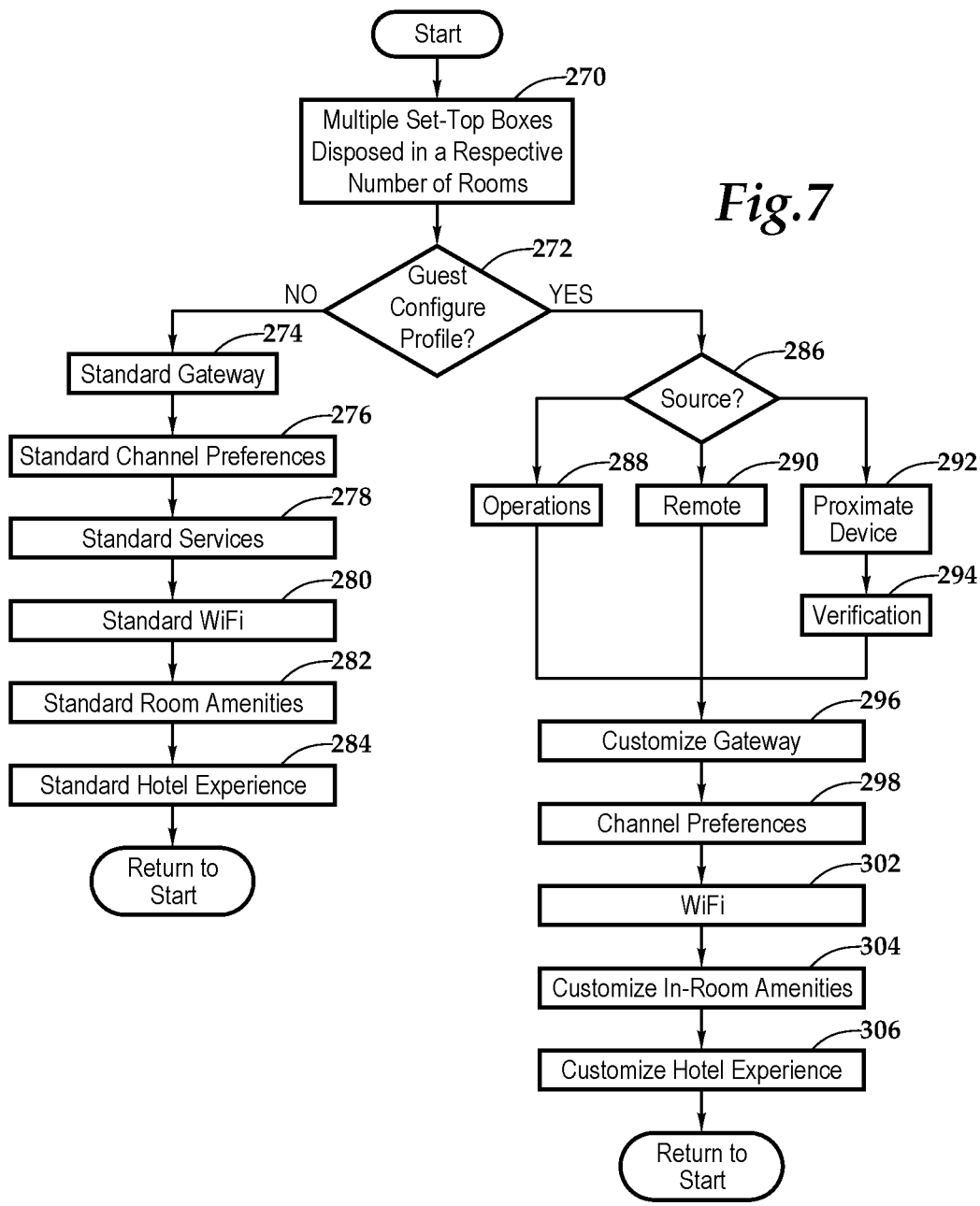

SET-TOP BOX WITH ENHANCED FEATURES AND SYSTEM AND METHOD FOR USE OF SAME

PRIORITY STATEMENT & CROSS-REFERENCE TO RELATED APPLICATIONS

This application is a continuation of U.S. patent application Ser. No. 16/524,893 entitled "Set-Top Box with Enhanced Features and System and Method for Use of Same" and filed on Jul. 29, 2019, which issued on Jan. 5, 2021 in the names of Thomas R. Miller et al., now U.S. Pat. No. 10,887,627; which claims priority from U.S. Patent Application No. 62/711,129 entitled "Set-Top Box with Enhanced Features and System and Method for Use of Same" and filed on Jul. 27, 2018, in the names of Vanessa Ogle et al.; both of which are hereby incorporated by reference for all purposes. application Ser. No. 16/524,893 is also a continuation-in-part of U.S. patent application Ser. No. 16/365,444, entitled "Set-Top Box with Interactive Portal and System and Method for Use of Same" and filed Mar. 26, 2019, in the names of Vanessa Ogle et al.; which is a continuation of U.S. patent application Ser. No. 15/860,509, entitled "Set-Top Box with Interactive Portal and System and Method for Use of Same" and filed on Jan. 2, 2018, in the names of Vanessa Ogle et al., now U.S. Pat. No. 10,244,269, and issued on Mar. 26, 2019; which is a continuation of U.S. patent application Ser. No. 15/847,247, entitled "Set-Top Box with Interactive Portal and System and Method for Use of Same" and filed on Dec. 19, 2017, in the names of Vanessa Ogle et al., now U.S. Pat. No. 10,142,663, and issued on Nov. 27, 2018; which is a continuation of U.S. patent application Ser. No. 15/625,416, entitled "Set-top Box with Interactive Portal and System and Method for Use of Same" and filed on Jun. 16, 2017 in the names of Vanessa Ogle et al., now U.S. Pat. No. 9,848,211, and issued on Dec. 19, 2017; which is a continuation of U.S. patent application Ser. No. 15/203,515, entitled "Set-top Box with Interactive Portal and System and Method for Use of Same" and filed on Jul. 6, 2016 in the names of Vanessa Ogle et al., now U.S. Pat. No. 9,716,902, and issued on Jul. 25, 2017; which claims priority from U.S. Patent Application Ser. No. 62/188,976, entitled "Set-top Box with Interactive Portal and System and Method for Use of Same" and filed on Jul. 6, 2015 in the names of Vanessa Ogle et al.; which are hereby incorporated by reference for all purposes herein. U.S. patent application Ser. No. 15/203,515, entitled "Set-top Box with Interactive Portal and System and Method for Use of Same" and filed on Jul. 6, 2016, in the names of Vanessa Ogle et al., is also a continuation-in-part of U.S. patent application Ser. No. 14/803,428, entitled "Set-Top Box with Interactive Portal and System and Method for Use of Same" and filed on Jul. 20, 2015, in the names of Vanessa Ogle et al., and issued on Apr. 26, 2016, as U.S. Pat. No. 9,326,009; which is a continuation of U.S. patent application Ser. No. 14/294,123, entitled "Set-top Box with Interactive Portal and System and Method for Use of Same" and filed on Jun. 2, 2014, in the names of Vanessa Ogle et al., and issued on Jul. 21, 2015 as U.S. Pat. No. 9,088,828; which claims priority from U.S. Patent Application Ser. No. 61/829,932, entitled "On-Screen Display" and filed on May 31, 2013, in the name of Vanessa Ogle; all of which are hereby incorporated by reference, in entirety, for all purposes.

TECHNICAL FIELD OF THE INVENTION

This invention relates, in general, to set-top boxes and, in particular, to set-top boxes with interactive portals and systems and methods for use of the same that provide additional functionality to the hospitality lodging industry, as an example.

BACKGROUND OF THE INVENTION

Without limiting the scope of the present invention, the background will be described in relation to the use of smart devices in the hospitality lodging industry, as an example. Making a hotel "a home away from home" is a goal of many hoteliers in the hospitality lodging industry. Hotels are providing more amenities and conveniences than ever for the comfort of patrons in order to offer superior advantages for guests. Traditionally, amenities and conveniences focused on the quality of the room, in-room entertainment, food and beverage service, on-premise amenities such as gyms and spas, and concierge service. With the explosion of the internet, smartphones, and other smart devices, the usability and ease of use of these smart devices at hospitality lodging establishments has become a necessary amenity and convenience. Accordingly, there is a need for improved systems and methods that ensure amenities that provide for the use of smart devices in a hospitality lodging establishment, while providing the convenience and integration into existing and planned hospitality lodging establishments.

SUMMARY OF THE INVENTION

It would be advantageous to introduce systems and methods that further ensure amenities that provide for the use of proximate wireless-enabled interactive programmable devices in a hospitality lodging establishment. It would also be desirable to enable a computer-based solution that would augment the convenience and integration of a guest-customized experience into existing and planned hospitality lodging establishments. To better address one or more of these concerns, a set-top box with an interactive portal and system and method for use of the same are disclosed. In one embodiment of the set-top box, the set-top box is deployed to provide an interactive portal in a hospitality establishment having multiple rooms, such as a hotel.

The set-top box is associated with a room and includes a housing that secures a television input, a television output, a processor, a transceiver, and memory therein in an interconnected bus architecture. The set-top box generates a default interactive portal as well as a guest-specific interactive portal, which is generated from a guest configuration profile having information including guest identification, a guest channel preference presentation, and a guest service preference presentation with guest account information. In response to receiving the guest configuration profile, a local area wireless network for a guest device may be activated to a network associated with the hospitality establishment. The local area wireless network may have substantially identical behavior to a home wireless network belonging to the guest such that the local area wireless network provides substantially identical network configuration and device, application, and service login credentials as the home wireless network. The guest configuration profile may further enable the control of in-room amenities such as temperature control, lighting, shades, and availability, for example, with preferred, guest-specific settings. In another embodiment, a system deploys the set-top boxes in rooms throughout the lodging establishment to provide both a default and the convenience of a guest-specific interactive portal in each room. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 7 is a flow chart depicting one embodiment of a method for providing a set-top box having a guest configuration profile thereon according to the teachings presented herein.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
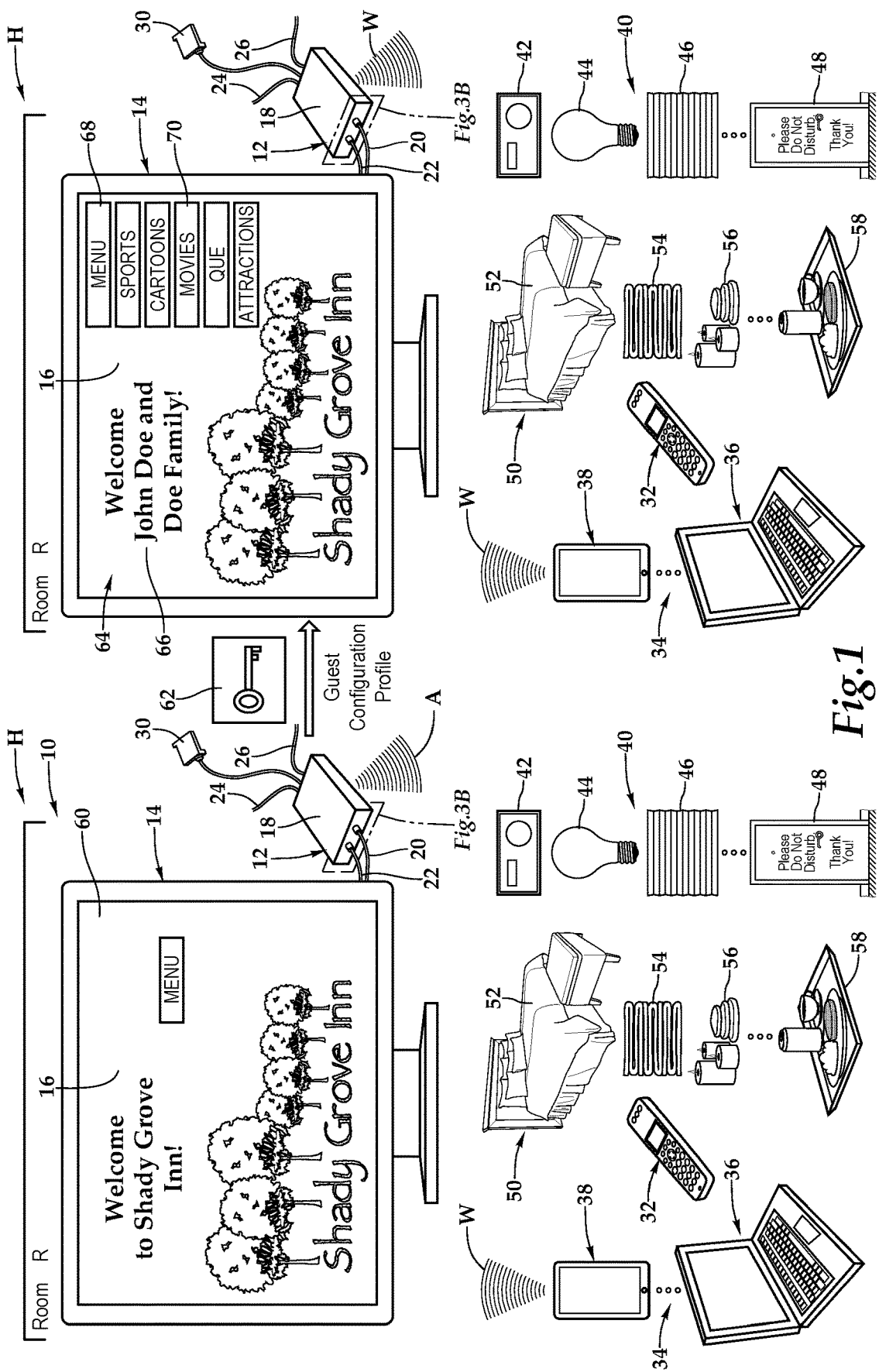
FIG. 1 is a schematic diagram depicting one embodiment of a system for providing a set-top box having a guest configuration profile thereon according to the teachings presented herein.

Referring initially to FIG. 1, therein is depicted one embodiment of a system 10 utilizing set-top boxes 12 with guest-specific interactive portals being employed within a hospitality lodging establishment H. The hospitality lodging establishment or more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R. It should be appreciated, however, the teachings presented herein are not limited to hospitality lodging establishments or hospitality properties.

The set-top boxes 12 are communicatively disposed with various amenities, including a display 14, associated with the hospitality environment, which as mentioned is depicted as the hotel H. The set-top boxes 12 may be deployed throughout the rooms R of the hotel H as well as common spaces. As shown, in one embodiment, within a room R, the system 10 includes the set-top box 12 and the display 14 illustrated as television having a screen 16. It should be appreciated however, that the display 12 may be any electronic visual display device or television set, for example. The set-top box 12 includes a housing 18 and a connection, which is depicted as an HDMI connection 20, connects the set-top box 12 to the display 14. Other connections include a power cable 22 coupling the set-top box 12 to a power source, a coaxial cable 24 coupling the set-top box 12 to external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box may be a set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 14 or mounted, partially or completely, within a wall of the room R, for example.

A television remote control 32 includes an array of buttons for adjusting various settings such as television channel and volume. In one embodiment, the television remote control 32 may be a consumer infrared (IR) or other protocol, such as Bluetooth, device configured as a small wireless handheld object that issues commands from a distance to the set-top box 12 in order to control the display 14 via the set-top box 12, for example. A proximate wireless-enabled interactive programmable device 34 may be a wireless-enabled interactive handheld device that may be supplied or carried by the guest and may be selected from a range of existing devices, such as, for example personal computers (such as personal computer 36), laptops, tablet computers, smart phones (such as smart phone 38), smart speakers, and smart watches, for example. As will be discussed in further detail below, in one implementation, an application installed from a server enables the set-top box 12 and the proximate wireless-enabled interactive programmable device 34 to be wirelessly paired. In another embodiment, a challenge-response is utilized to wirelessly pair the set-top box 12 and the proximate wireless-enabled interactive programmable device 34. The set-top box 12 may communicate wirelessly, as indicated by wireless signaling W, with the various proximate wireless-enabled interactive programmable devices 34.

The set-top box 12 may also communicate wirelessly, as indicated by wireless signaling W, with various amenities 40, which are depicted as in-room environmental amenities, within an environment of the room R. As shown, the amenities may include lighting 44, a thermostat 42 representing temperature control, window shades 46, and security 48, which is depicted as a door indication for "Please Do Not Disturb." The set-top box 12 may also enable various services 50, which are depicted as in-room and on-premises hospitality services, including turndown service 52, towel service 54, and spa scheduling 56, and room service 58.

As shown, a default interactive portal 60 is displayed on the screen 16, unless a guest configuration profile 62 is loaded within the set-top box 12. The guest configuration profile 62 may be loaded from the operations, e.g., the front desk or hotel headend, by use of the remote control 32, or by a proximate device, such as the proximate wireless-enabled interactive programmable device 34. In one implementation, as illustrated, the set-top box 12 extends a physical authorization interface, shown as area A, from the set-top box to an area easily accessible to transitory guests' convenience such as in front or side of the television 12. This physical authorization interface A may include a short range wireless data connection that is enabled only when very close physically to the proximate wireless-enabled interactive programmable device 34, for example. Further, once the pairing is established, the set-top box 12 provides a secure wireless interface to communicate transitory guest user device authorization information to the set-top box 12 to accomplish verification. Once authorization information is communicated to the set-top box, the set-top box enables the guest configuration profile 62.

Enabled, the guest configuration profile 62 provides a customized set-top box experience. More particularly, the guest configuration profile 62 includes guest identification, a guest channel preference presentation, and a guest service preference presentation with guest account information. The guest configuration profile 62 may be a guest-specific, guest-customized set-top box generated environment referencing an explicit digital representation of a guest's identity. The set-top box 12 generates a guest interactive portal 64 including a guest indication acknowledgement 66, a guest channel preference presentation 68, and a guest service preference presentation 70, which includes premium programming, game, and music content, for example. Further, personal area network and local area network connectivity is provided to the proximate wireless-enabled interactive programmable device 34.

The set-top box 12, with use of the guest configuration profile 62, may also control the amenities 40, such as the lighting 44, thermostat 42, window shades 46, and security 48. Such room automation provides for smart controls such as setting the lighting 44 or thermostat 42 or window shades 46 to the preferred setting before the guest walks into the room. Based on the control settings, the amenities 40 themselves react to scenarios accordingly. In one implementation, automated lighting may be activated at a certain time, or climate controls may shift temperature at various intervals. In this respect, smart amenity automation places a portion of the onus of decision making on the amenities 40. Therefore, instead of manually controlling settings, guests set parameters or parameters are established based on a comparable home amenity belonging to the guest or based on amenity behavior from a previous stay. As conditions are met, the amenities automatically adjust according to the parameters. By way of example, as previously alluded, lighting 44 may turn on when a guest walks in the room or your window shades 46 raise up when a specified level of sunlight hits the window, or lowering the temperature when you arrive and raising the temperature when you leave.

Figure 2A:
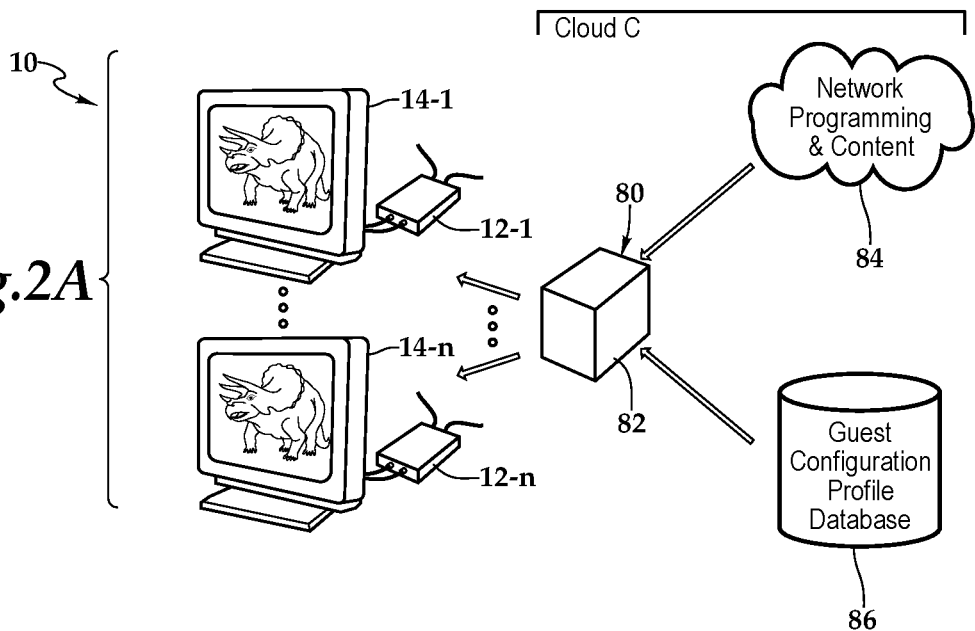
FIG. 2A is a schematic diagram depicting one embodiment of the system of FIG. 1 within a cloud-computing deployment.
Figure 2B:
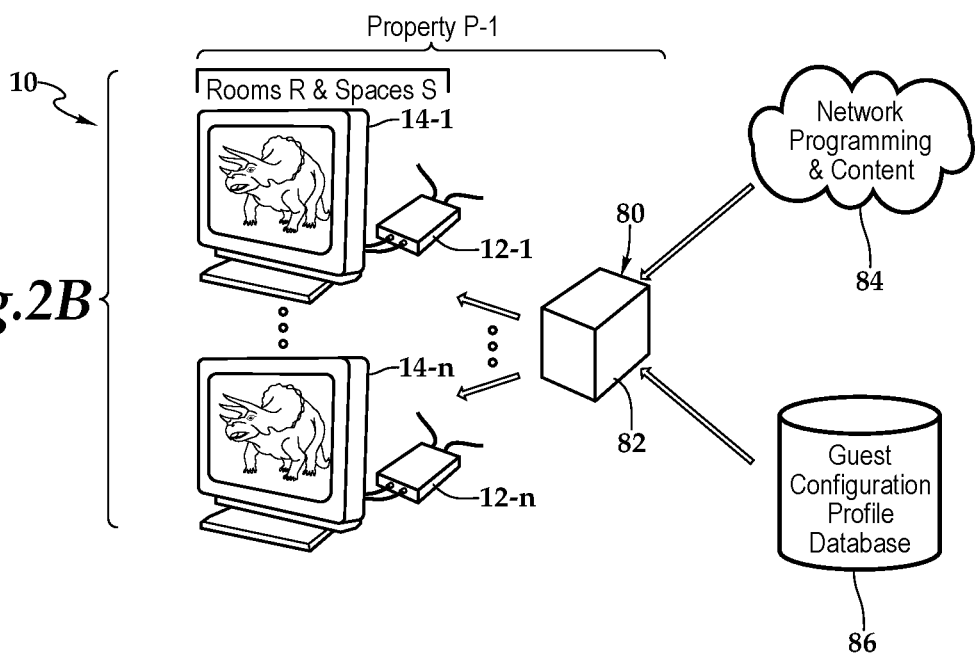
FIG. 2B is a schematic diagram depicting one embodiment of the system of FIG. 1 within an on-property deployment.
Figure 2C:
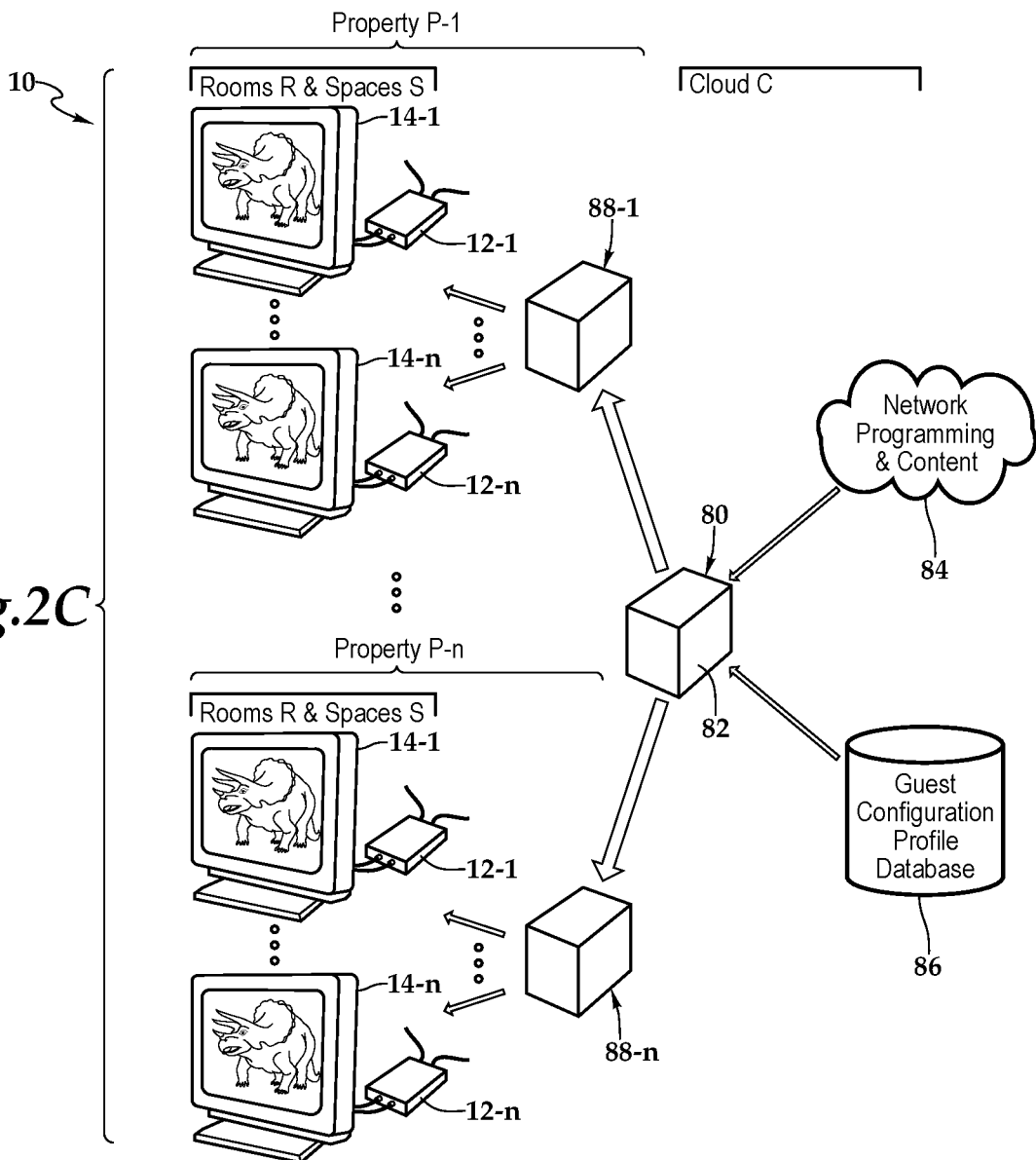
FIG. 2C is a schematic diagram depicting one embodiment of the system of FIG. 1 within a cloud-computing deployment serving multiple properties.
Figure 3A:
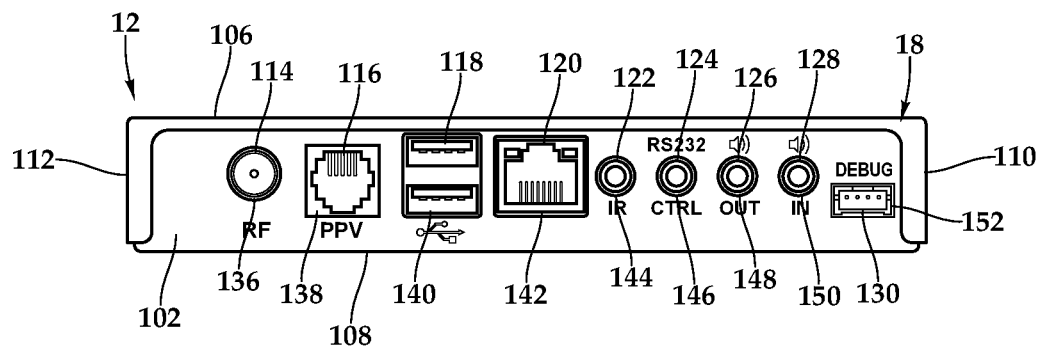
FIG. 3A is a front elevation view of one embodiment of a set-top box depicted in FIG. 1 in further detail.
Figure 3B:
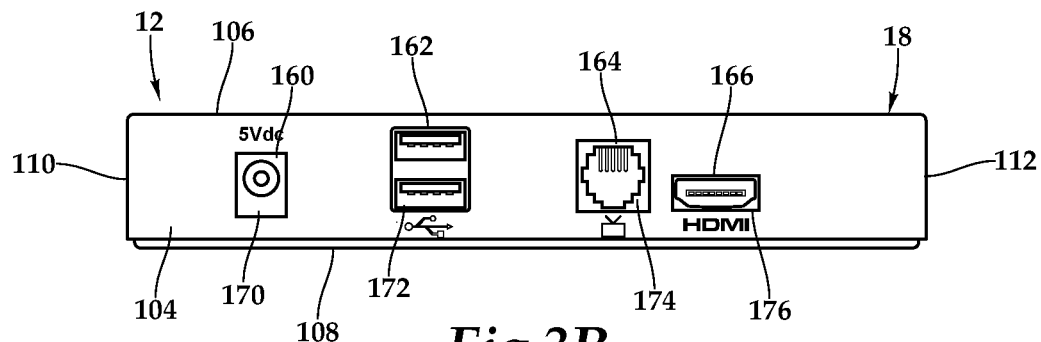
FIG. 3B is a rear elevation view of the set-top box depicted in FIG. 2A.
Figure 3C:
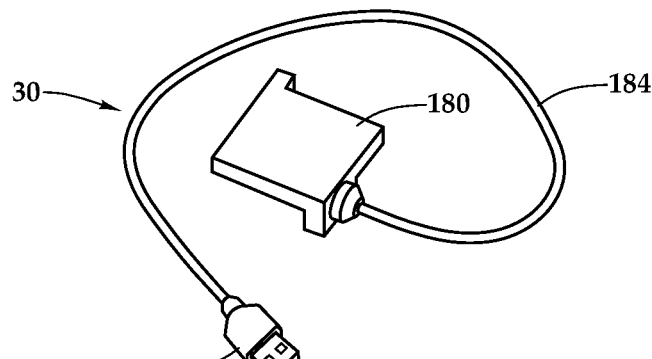
FIG. 3C is a front perspective view of a dongle depicted in FIG. 1 in further detail.
Figure 4:
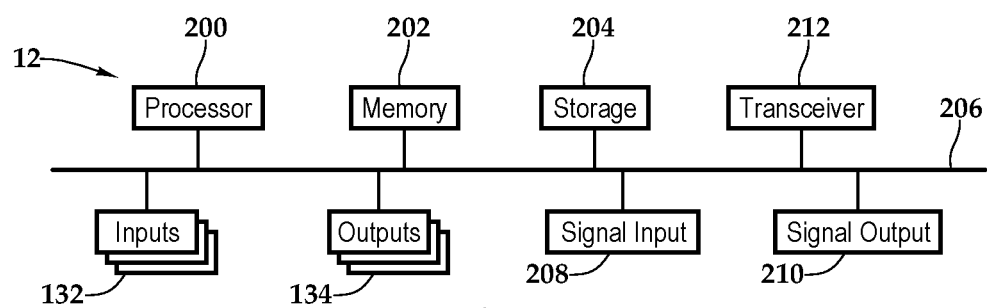
FIG. 4 is a functional block diagram depicting one embodiment of the set-top box presented in FIGS. 3A and 3B.

Referring now to FIG. 2A, FIG. 2B, and FIG. 2C, a server 80 may be remotely located to serve multiple set-top boxes and displays each located on different properties. It should also be appreciated that the server 80 may be located on a single property to serve one or more set-top boxes and displays thereon. Further, it should be appreciated that the server 80 may be remotely located to serve multiple properties having multiple televisions.

Referring now to FIG. 2A, the system 10 may be deployed such that the server 80, which includes a housing 82, is remotely located in the cloud C to service disbursed set-top boxes 12-1 ... 12-*n* and corresponding displays 14-1 ... 14-*n*, with, in one embodiment, network programming content sources 84 configured to provide sources of network programming and content. The server 80 includes the housing 82 having a signal output and other components therein. The server 80 has access to guest configuration profile database 86, which stores the aforementioned guest configuration profile database 86. In addition to providing access to guest configuration profile database 86 by the set-top boxes 12, the server 80 may receive data from the set-top boxes 12, including guest interaction data, which will be discussed in further detail hereinbelow. In one implementation, the guest interaction data may be stored at the guest configuration profile database 86.

Referring now to FIG. 2B, the system 10 may be deployed such that the server 80, which includes the housing 82, is co-located on the property P-1 with the set-top boxes 12-1 ... 12-*n* and the corresponding displays 14-1 ... 14-*n*, with, in one embodiment, the network programming content sources 84 configured to provide sources of network programming and content. The property P-1 may have various rooms R and spaces S where the set-top boxes 12-1 ... 12-*n* and the corresponding displays 14-1 ... 14-*n* are displayed. The server 80 has access to the guest configuration profile database 86, which stores the aforementioned guest configuration profile database 86.

Referring to FIG. 2C, the system 10 may be deployed such that the server 80 is located remotely within cloud C relative to set-top boxes 12-1 ... 12-*n*, which are located at properties P-1 through P-n. Each property P-1 ... P-n has various rooms R and spaces S. In particular, the server 80, which receives content from network programming content sources 84 and guest configuration profiles from the guest configuration profile database 86, may be located remotely relative to the set-top boxes 12-1 ... 12-*n* and displays 14-1 ... 14-*n* such that a property headend 88-1 ... 88-*n* is interposed between the server 80 and the set-top boxes 12-1 ... 12-*n*. As shown, in this implementation, the servers 88-1 ... 88-*n*, which may be property headends, are co-located with the set-top boxes 12-1 ... 12-*n* at a respective property, P-1 through P-n.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 18 having a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall includes various ports, ports 114, 116, 118, 120, 122, 124, 126, 128, and 130 that provide interfaces for various interfaces, including inputs and outputs. In one implementation, as illustrated, the ports 114 through 130 include inputs 132 and outputs 134 and, more particularly, an RF input 136, a RJ45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. It should be appreciated that the configuration of ports may vary with the set-top box depending on application and context. As previously alluded to, the housing 18 may include a housing-dongle combination including, with respect to the dongle 30, a unit 180 having a cable 184 with a set-top box connector 182 for selectively coupling with the set-top box 12.

Within the housing 18, a processor 200, memory 202, storage 204, the inputs 132, and the outputs 134 are interconnected by a bus architecture 206 within a mounting architecture. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 12. Various inputs 132 and outputs 134 provide connections to and from the computing device, wherein the inputs 132 are the signals or data received by the set-top box 12, and the outputs 134 are the signals or data sent from the set-top box 12.

A television content signal input 208 and a television content signal output 210 are also secured in the housing 18 in order to receive content from a source in the hospitality property and forward the content, including external content such as cable and satellite and pay-per-view (PPV) programming, to the television located within the hotel room.

A transceiver 212 is associated with the set-top box 12 and communicatively disposed with the bus 206. As shown the transceiver 212 may be internal, external, or a combination thereof to the housing. Further, the transceiver 212 may be a transmitter/receiver, receiver, or an antenna for example. Communication between various amenities in the hotel room and the set-top box 12 may be enabled by a variety of wireless methodologies employed by the transceiver 212, including 802.11, 802.11 a/b/g/n/ac, 3G, 4G, Edge, WiFi, ZigBee, near field communications (NFC), Bluetooth low energy and Bluetooth, for example. Also, infrared (IR) may be utilized.

The memory 202 and storage 204 are accessible to the processor 200 and include processor-executable instructions that, when executed, cause the processor 200 to execute a series of operations. The processor-executable instructions receive a guest configuration profile 62, which as previously discussed may include guest identification, a guest channel preference presentation 68, and a guest service preference presentation 70 with guest account information. Also, as previously discussed, the guest configuration profile is a guest-specific, guest-customized set-top box generated environment referencing an explicit digital representation of a guest's identity.

In response to receiving the guest configuration profile 62 at the set-top box 12, the processor-executable instructions cause the processor 200 to temporarily override the default profile and generate a guest interactive portal 64 including a guest indication acknowledgement 66, the guest channel preference presentation 68, and the guest service preference presentation 70. Further, in response to receiving the guest configuration profile 62, the processor-executable instructions cause the processor 200 to activate a local area wireless connection for a guest device, such as the proximate wireless-enabled interactive programmable device 34, to a network associated with the hospitality establishment H. Alternatively, in response to a default profile, the processor-executable instructions cause the processor 200 to generate a default interactive portal prior to forwarding one of the guest interactive portal 64 and the default interactive portal 60, as appropriate, to the television via the television output. In implementations with multiple set-top boxes disposed in respective multiple rooms, at least one of the set-top boxes will generate a guest interactive portal 64 and at least one of the plurality of set-top boxes will potentially generate a default interactive portal 60.

In response to receiving the guest configuration profile at the set-top box 12, the processor-executable instructions cause the processor 200 to control an in-room amenity based on the guest configuration profile 62. The control of the in-room amenity may include providing a setting to the in-room amenity, such as a lighting setting to a lighting control panel, a temperature setting to a temperature control unit, a shade setting to a shade control unit or a do not disturb setting to a door control unit, for example. The memory 202 may also include processor-executable instructions that, when executed, cause the processor 200 to monitor guest interaction with the in-room amenity and record guest interaction data relative to the guest interaction with the in-room amenity. The processor-executable instructions may then, when executed, cause the processor 200 to transmit the guest interaction data to a server. Thereafter, the guest amenity profile of the guest configuration profile 62 may be refined based on the guest interaction data.

Figure 5:
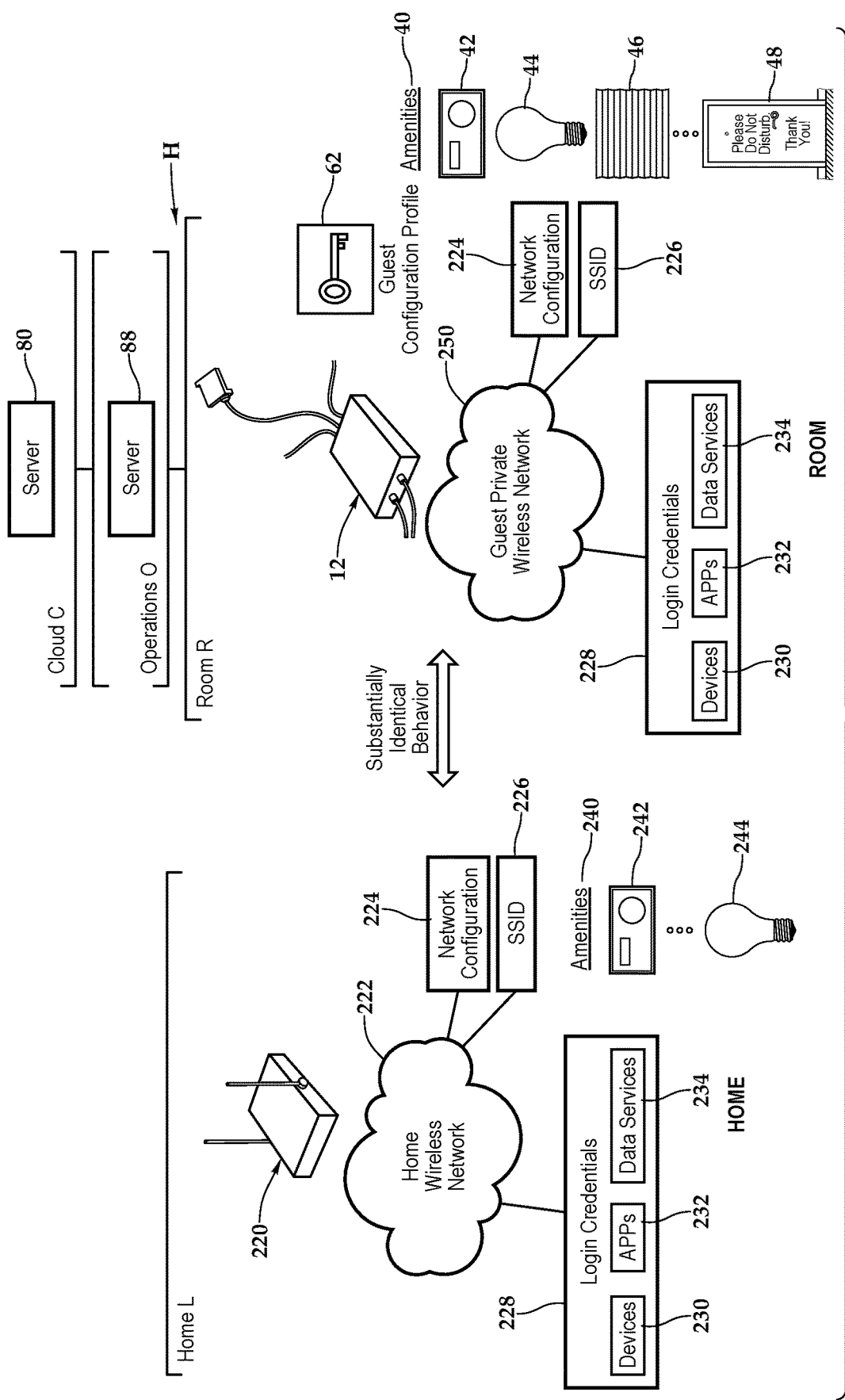
FIG. 5 is a schematic diagram depicting one embodiment of the structure and functionality of the system depicted in FIG. 1.

Referring now to FIG. 5, at a guest's home L, a wireless access point 220 provides the networking hardware device, such as a router, that allows Wi-Fi compliant devices to connect to a wired network by way of a private wireless network, which is illustrated as home wireless network 222. The home wireless network 222 has a network configuration 224, which provides the network management protocol and mechanisms to install, manipulate, and delete the configuration of various network devices. Such a network configuration 224 may also include a network identification, which is shown as a Service Set Identifier (SSID) 226. In one implementation, the SSID may be a series of 0 to 32 octets that is used as an identifier for the wireless Local Area Network (LAN) and is intended to be unique for the particular home wireless network 222. Various login credentials 228 are also associated with the home wireless network 222. The login credentials 228 may include user names and passwords that permit various devices 230, applications 232, and services 234 to operate over the home wireless network 222. The devices 230 may include the proximate wireless-enabled interactive programmable device 34, for example. The applications 232 may include a computer program designed to perform a group of coordinated functions, tasks, or activities operating on the devices 230 for the benefit of the user, which in this instance may be the guest. The services 234, which are shown as data services, may include various subscription or non-subscription services that provide access to streaming or archived content, such as literature, music, television, and movies, for example. The services 234 may be enabled by the devices 230. It should be appreciated that overlap between the devices 230, the applications 232, and the services 234 may exist.

The home wireless network 222 permits users' or guests' devices 230, applications 232, and services 234 to work seamlessly at the home L without the need for continuous new configuration. The aforementioned guest configuration profile 62 associated with the set-top box 12 within the room R of the hotel H configures a guest private wireless network 250 that acts as an access point having the same network configuration 224, SSID 226, and login credentials 228 for the devices 230, the applications 232, and the services 234. This creates a home away from home environment for the guest, where all of the guest carry devices 230, applications 232, and services 234, including streaming movie services, work within the room R as the guest carry devices 230, applications 232, and services 234 work at the home wireless network 222 at the home L. In one embodiment, the guest configuration profile 62 provides the guest private wireless network 250 with substantially identical behavior as the home wireless network 222. Therefore, no new configuration is required at the room R. In one implementation, the guest configuration profile 62 may access the information and data necessary to provision the guest private wireless network 250 from the server 80, which may be located offsite or within a cloud C, for example, or the server 88, which may be located on-site, for example. In operation, in response to receiving the guest configuration profile 62, a local area wireless network may be activated for a guest device to a network associated with the hospitality establishment H. The local area wireless network may have substantially identical behavior to a home wireless network belonging to the guest such that the local area wireless network provides substantially identical network configuration and device, application, and service login credentials as the home wireless network. In particular, the guest configuration profile 62 may enable the creation of a local area wireless network with substantially the same behavior as the guest's home wireless network. As previously alluded, the guest configuration profile 62 not only establishes the guest private wireless network 250, but may also provision room-specific guest preferred features such as room temperature, television lineup, and other amenity preferences.

With respect to various in-room amenities, such as a thermostat 42, lighting 44, window shades 46, and security 48, the guest configuration profile 62 establishes controls, including programming and preferences, based on, for example, the amenities 240 at the home L. By way of example and not by way of limitation, the control of the thermostat 242 at the home L informs the guest configuration profile 62, which controls the temperature at the room R within the hotel H. Similarly, the control of the lighting 244 at the home L informs the guest configuration profile 62, which controls the lighting 44 at the room R within the hotel H to provide substantially identical behavior.

Figure 6:
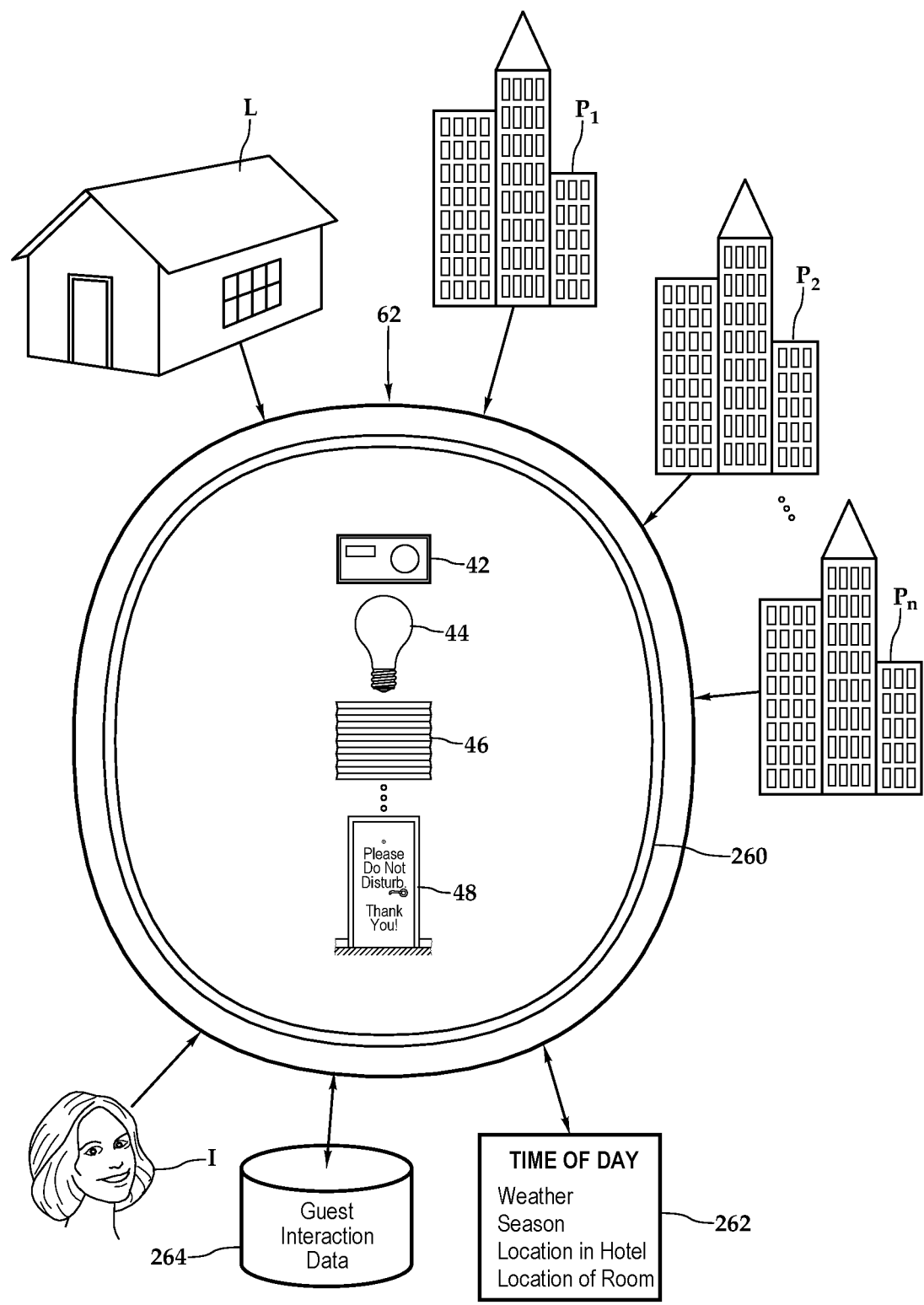
FIG. 6 is a schematic diagram depicting one embodiment of the structure and function of the guest configuration profile depicted in FIG. 1.

Referring now to FIG. 6, the guest configuration profile 62 includes a guest amenity profile 260 which establishes controls, including programming and preferences, for the various in-room amenities 40, including, for example, lighting 44, a thermostat 42, window shades 46, and security 48. The guest configuration profile 62 is based on, for example, the use of amenities at the home L, previous lodging establishment stays as represented by properties $P_1$, $P_2$, ... $P_n$. Additionally, the guest configuration profile 62 may provide the in-room amenity 40 control based on time and location factors 262, such as time of day, weather, season, location in the hotel, and location of a room. An individual I, such as the guest, may also influence the guest configuration profile 62. As the in-room amenities 40 are utilized, guest interaction data 264 is generated, which may be employed to further refine the guest amenity profile 260 of the guest configuration profile 62.

Referring now to FIG. 7, a method for using a set-top box with enhanced features and an interactive portal is shown. At block 270, multiple set-top boxes are disposed in a respective number of rooms within a lodging establishment. At decision block 272, if a guest configuration profile is not available then the methodology advances to block 274 where a standard gateway and interactive experience is provided before the method returns to start. Standard channel preferences (block 276), standard services (block 278), standard network or WiFi service (block 280), standard room amenities (block 282), and a standard hotel experience (block 284) are provided along with the aforementioned standard gateway.

With reference to decision block 272, on the other hand, if a guest configuration profile is available, then the process advances to decision block 286 where the guest configuration profile is installed from the appropriate source. At block 288, installation is provided from hotel operations, such as a front desk or hotel headend. At block 290, the remote control in the room may provide the guest configuration profile. As a third alternative, at block 292, a proximate wireless-enabled interactive programmable device may be further verified at block 294 and provide the guest configuration profile.

Following blocks 288, 290, 292 and 294, the methodology continues to block 296, wherein a customized interactive portal is built based on the guest configuration profile. The customized interactive portal may include the guest's name or similar information. Continuing with blocks 298, 302, 304, and 306, the methodology customizes the channel preferences, channel services, local area network connectivity, e.g., WiFi, for devices, customizes room amenities, and customizes the hotel experience in accordance with the guest configuration profile.

That is, in one implementation, following this methodology, various guest devices, such as the aforementioned proximate wireless-enabled interactive programmable devices and personal computers, may be registered and associated with the set-top box for the purpose of joining personal area networks or local area networks to enable various services on that network requiring authorization. Further, that is, in one implementation, following this methodology, various in-room amenities, such as the aforementioned temperature and lighting, may be automatically controlled and programmed for the enjoyment of the user, such as the guest.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description.

It is, therefore, intended that the appended claims encompass any such modifications or embodiments.

What is claimed is:

1. A system for configuring a guest experience in a hospitality establishment, the system comprising:
a set-top box disposed in a room, the set-top box programmably assigned to the room, the set-top box comprising:
a housing securing a signal input, a signal output, a transceiver, a processor, and memory therein;
a busing architecture communicatively interconnecting the signal input, the signal output, the transceiver, the processor, and the memory therebetween;
the signal input configured to receive a source signal from an external source, the source signal including a plurality of channels;
the signal output configured to forward a tuned signal to a display in the room, the signal being tuned from the source signal at the set-top box; and
the memory accessible to the processor, the memory including processor-executable instructions that, when executed, cause the processor to:
receive a guest configuration profile,
in response to receiving the guest configuration profile, activate a local area wireless network,
the local area wireless network having identical behavior to a home wireless network belonging to the guest, the local area wireless network providing identical network configuration and device login credentials as the home wireless network, and
in response to receiving the guest configuration profile, control an in-room amenity based on the guest configuration profile;
the guest configuration profile configuring the local area wireless network to be a guest private wireless network that acts as an access point having the same network configuration and login credentials for devices as the home wireless network belonging to the guest, thereby creating a home away from home environment for the guest with provisioning for room-specific guest preferred features;
the guest configuration profile requiring no new room configuration, the guest configuration profile accessing needed information and data to provision the guest wireless network from one of a co-located server and a cloud-located server; and
the guest configuration profile controlling the in-room amenity based on a guest amenity profile derived from at least one of a home amenity belonging to the guest, a previous stay amenity relative to the guest, time of day, and season.

2. The system as recited in claim 1, wherein the in-room amenity is selected from the group consisting of lighting, temperature control, window shades, and guest availability.

3. The system as recited in claim 1, wherein the home amenity belonging to the guest is selected from the group consisting of lighting, temperature control, window shades, and guest availability.

4. The system as recited in claim 1, wherein the previous stay amenity is selected from the group consisting of lighting, temperature control, window shades, and guest availability.

5. The system as recited in claim 1, wherein the in-room amenity comprises an identical functionality to the home amenity.

6. The system as recited in claim 1, wherein the in-room amenity comprises an identical functionality to the previous stay amenity.

7. The system as recited in claim 1, wherein the guest configuration profile further controls the in-room amenity based on a location of the hospitality establishment.

8. The system as recited in claim 1, wherein the guest configuration profile further controls the in-room amenity based on a location of the room in the hospitality establishment.

9. The system as recited in claim 1, wherein the guest configuration profile control of the in-room amenity further comprises providing a setting to the in-room amenity.

10. The system as recited in claim 1, wherein the guest configuration profile control of the in-room amenity further comprises providing a lighting setting to a lighting control panel.

11. The system as recited in claim 1, wherein the guest configuration profile control of the in-room amenity further comprises providing a temperature setting to a temperature control unit.

12. The system as recited in claim 1, wherein the guest configuration profile control of the in-room amenity further comprises providing a shade setting to a shade control unit.

13. The system as recited in claim 1, wherein the guest configuration profile control of the in-room amenity further comprises providing a do not disturb setting to a door control unit.

14. The system as recited in claim 1, wherein the memory further comprises processor-executable instructions that, when executed, cause the processor to:
monitor guest interaction with the in-room amenity; and
record guest interaction data relative to the guest interaction with the in-room amenity.

15. The system as recited in claim 14, wherein the memory further comprises processor-executable instructions that, when executed, cause the processor to transmit the guest interaction data to a server.

16. The system as recited in claim 14, wherein the guest amenity profile of the guest configuration profile is refined based on the guest interaction data.

17. The system as recited in claim 1, wherein the transceiver utilizes wireless signals selected from the group of wireless protocols consisting of 802.11, 802.11 a/b/g/n/ac, 3G, 4G, Edge, WiFi, ZigBee, near field communications (NFC), Bluetooth, and infrared (IR).

18. The system as recited in claim 1, wherein the memory includes processor-executable instructions that, when executed, cause the processor to receive the guest configuration profile via the signal input.

19. A system for configuring a guest experience in a hospitality establishment, the system comprising:
a set-top box disposed in a room, the set-top box programmably assigned to the room, the set-top box comprising:
a housing securing a signal input, a signal output, a transceiver, a processor, and memory therein;
a busing architecture communicatively interconnecting the signal input, the signal output, the transceiver, the processor, and the memory therebetween;
the signal input configured to receive a source signal from an external source, the source signal including a plurality of channels;
the signal output configured to forward a tuned signal to a display in the room, the signal being tuned from the source signal at the set-top box; and the memory accessible to the processor, the memory including processor-executable instructions that, when executed, cause the processor to:
receive a guest configuration profile, and
in response to receiving the guest configuration profile, control an in-room amenity based on the guest configuration profile; and
the guest configuration profile controlling the in-room amenity based on a guest amenity profile derived from at least one of a home amenity belonging to the guest, a previous stay amenity relative to the guest, time of day, and season.

20. A system for configuring a guest experience in a hospitality establishment, the system comprising:
a set-top box disposed in a room, the set-top box programmably assigned to the room, the set-top box comprising:
a housing securing a signal input, a signal output, a transceiver, a processor, and memory therein;
a busing architecture communicatively interconnecting the signal input, the signal output, the transceiver, the processor, and the memory therebetween;
the signal input configured to receive a source signal from an external source, the source signal including a plurality of channels;
the signal output configured to forward a tuned signal to a display in the room, the signal being tuned from the source signal at the set-top box; and
the memory accessible to the processor, the memory including processor-executable instructions that, when executed, cause the processor to:
receive a guest configuration profile, and
in response to receiving the guest configuration profile, control an in-room amenity based on the guest configuration profile;
the guest configuration profile requiring no new room configuration, the guest configuration profile accessing needed information and data from one of a co-located server and a cloud-located server; and
the guest configuration profile controlling the in-room amenity based on a guest amenity profile derived from at least one of a home amenity belonging to the guest, a previous stay amenity relative to the guest, time of day, and season.

* * * * *